United States Patent

Yamaguchi et al.

Patent Number: 5,198,662
Date of Patent: Mar. 30, 1993

[54] WATER TEMPERATURE DISTRIBUTION MEASUREMENT SYSTEM EMPLOYING OPTICAL CABLE AND MEANS FOR DETERMINING A WATER DEPTH AT VARIOUS POINTS ALONG THE OPTICAL CABLE

[75] Inventors: Masayoshi Yamaguchi; Tetsuji Ito, both of Osaka; Taro Aoki; Mutsuo Hattori, both of Zushi, all of Japan

[73] Assignees: Sumitomo Electric Industries, Ltd., Osaka; Japan Marine Science and Technology Center, Kanagawa, both of Japan

[21] Appl. No.: 743,221

[22] Filed: Aug. 9, 1991

[30] Foreign Application Priority Data

Aug. 9, 1990 [JP] Japan .................................. 2-212035

[51] Int. Cl.$^5$ ............................................. H01J 5/16
[52] U.S. Cl. ................................ 250/227.18; 374/137; 374/162
[58] Field of Search ..................... 250/227.14, 227.19, 250/227.18; 374/161, 129–131, 137, 162

[56] References Cited

U.S. PATENT DOCUMENTS

| | | | |
|---|---|---|---|
| 4,523,092 | 6/1985 | Nelson ................................. | 374/131 |
| 4,713,538 | 12/1987 | Theocharous ................... | 250/227.23 |
| 4,767,219 | 8/1988 | Bibby ................................. | 374/160 |
| 4,904,864 | 2/1990 | Dakin et al. ..................... | 250/227.18 |
| 5,054,935 | 10/1991 | Tanabe et al. ................... | 250/227.14 |
| 5,102,232 | 4/1992 | Tanabe et al. ................... | 250/227.14 |

Primary Examiner—David C. Nelms
Assistant Examiner—S. Allen
Attorney, Agent, or Firm—Wenderoth, Lind & Ponack

[57] ABSTRACT

A measuring system measures temperature distribution in water using an optical fiber. An optical fiber cable suspended from a ship and towed by the ship to form an arch within the water. A measuring device for continuously measuring temperature at various points along the lengths of said optical fiber cable. Sensors are provided within the water to calculate the water depth at each of the various points along the length of the arch shaped optical fiber. Thus, a temperature distribution at each water depth can be continuously measured.

12 Claims, 4 Drawing Sheets

WATER TEMPERATURE DISTRIBUTION MEASUREMENT SYSTEM EMPLOYING OPTICAL CABLE AND MEANS FOR DETERMINING A WATER DEPTH AT VARIOUS POINTS ALONG THE OPTICAL CABLE

BACKGROUND OF THE INVENTION

1. Field of the Invention

This invention relates to a system for measuring temperature distribution in water using optical fibers.

2. Description of the Related Art

One conventional method for measuring temperature distribution in water is known as a slide method in which a transmission cable having a sensor unit slidably mounted thereon is suspended in the water and the sensor unit is conveyed up and down while the transmission cable is towed to obtain temperature information at predetermined water depths. The temperature information thus obtained is transmitted to a device on board a ship by utilizing electromagnetic coupling between the sensor unit and the transmission cable.

In another known method, a sensor chain is used which includes a plurality of sensor units mounted on a transmission cable in tiers. Each sensor is electromagnetically coupled to the transmission cable to transmit the temperature information to an on-board measuring device using a polling technique.

In the slide method, since the temperature at different water depth is measured while raising and lowering the sensor unit, it is impossible to continuously measure the temperature at a predetermined depth.

The sensor chain method also suffers a drawback in that an increased number of sensor units is used according to the number of measurement points. It is troublesome to mount and remove a great number of sensor units.

SUMMARY OF THE INVENTION

An object of the present invention is to provide a system for measuring temperature distribution in the water which obviates the abovesaid problems of the conventional methods.

According to this invention, a measuring device is used for measuring the temperature distribution along a longitudinal direction of an optical fiber cable connected to the measuring device and suspended from a ship in the water so as to be towed by the ship. Thus, temperatures at different water depths can be easily measured.

As one means for measuring the temperature distribution along a longitudinal direction of the optical fiber cable, this invention utilizes the principle that the intensity of the backward scattered lights (Raman lights) of optical pulses incident into the optical fiber cable is temperature dependent.

When suspended from the observatory ship in the water, the optical fiber cable will drift rearwards in a catinary arch as a result of the influences of the water (ocean) current and the towing speed. In this state, there is no correspondence between the water depth and the distance from the cable end. Thus, the results of measurement obtained by this method are not precisely related to the water depths.

According to this invention, there is provided a towed body mounted on the tip of the optical fiber cable. It includes various sensors, including a current velocity sensor and a converter for converting the signals from the sensors, into optical signals. The measuring device receives the optical measurement signals from the towed body transmitted through the optical fiber cable while also simultaneously receiving the backward scattered lights of the optical signals for measuring temperature fed into the optical fiber cable, and separates the two kinds of optical signals to obtain the temperature distribution data from the backward scattered lights and part of the data for correcting the depth of the optical fiber cable from the optical measurement signals.

Also, an isolator may be provided between the converter in the towed body and the tip of the optical fiber cable to permit the passage of the optical signals from the towed body while blocking the optical signals from the ship for measuring temperature.

Further, the measuring device may further include a confluence/branch means and a wavelength filter or a one-piece unit containing both the confluence/branch means and the wavelength filter to separate the optical measurement signals and the optical signals for measuring temperature and to differentiate the wavelengths of the two kinds of signals.

The optical fiber cable may be made by twisting a metal pipe containing optical fibers together with a filler material and tension members provided around the metal pipe.

According to this invention, the temperature distribution at different water depths can be measured continuously.

The temperature distribution along the optical fiber cable can be easily measured by receiving the scattered light of the optical signal incidnet on the optical fiber cable.

The temperature distribution in the depth direction of the water can be measured continuously while towing the optical fiber cable since the temperature distribution along the optical fiber cable can be corrected to the temperature distribution in the depth direction of the water.

Since the current velocity data used for the correction into the temperature distribution in the depth direction of the water can be transmitted through the optical fiber cable, only one optical fiber is necessary. This arrangement is thus economical.

The cable according to this invention has a small diameter and exhibits a high water pressure resistance and good heat conduction.

BRIEF DESCRIPTION OF THE DRAWINGS

Other features and objects of the present invention will become apparent from the following description taken with reference to the accompanying drawings, in which.

DESCRIPTION OF THE PREFERRED EMBODIMENT

Figure 1:
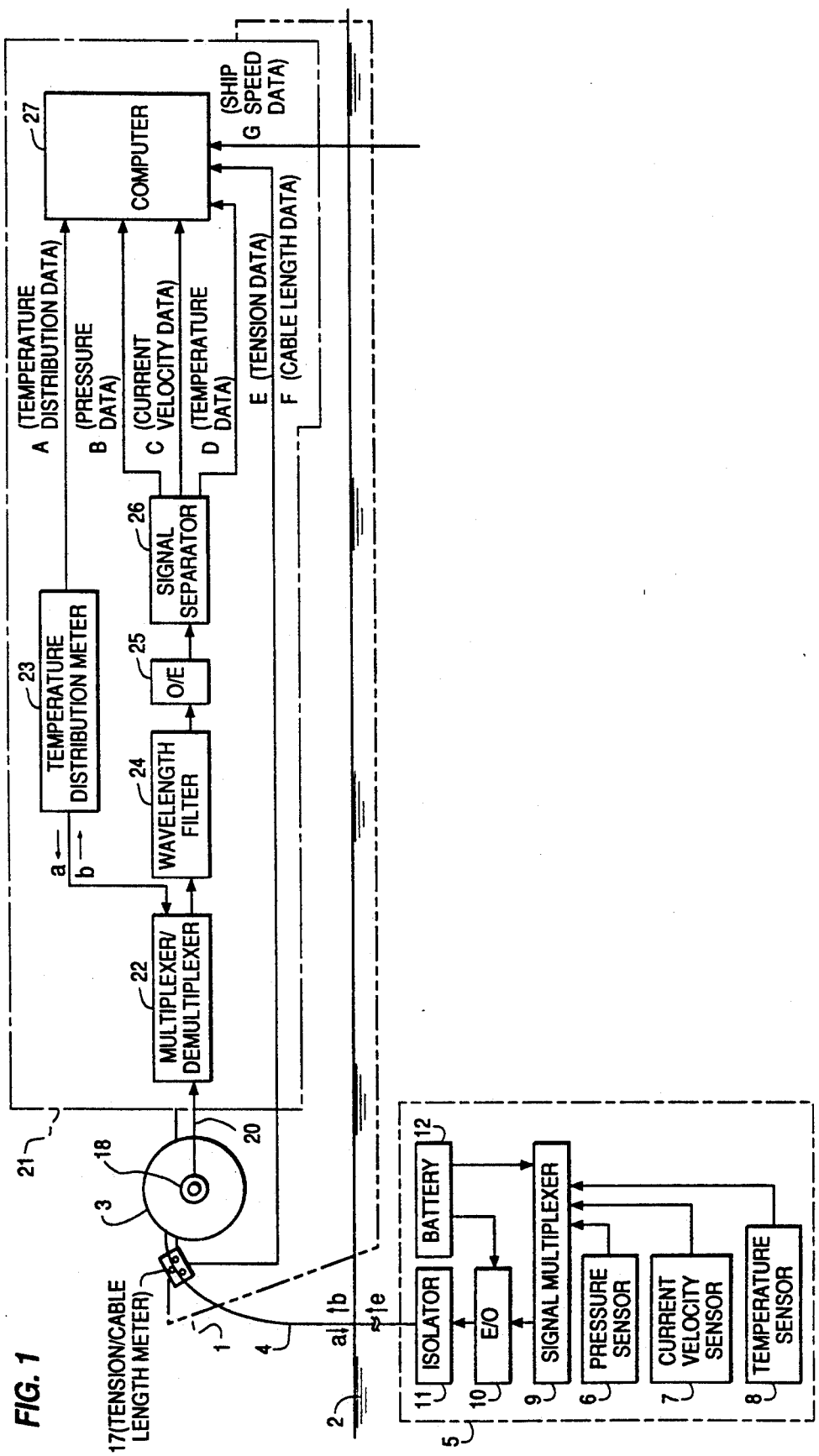
FIG. 1 is a block diagram of the entire system of the present invention.
Figure 2:
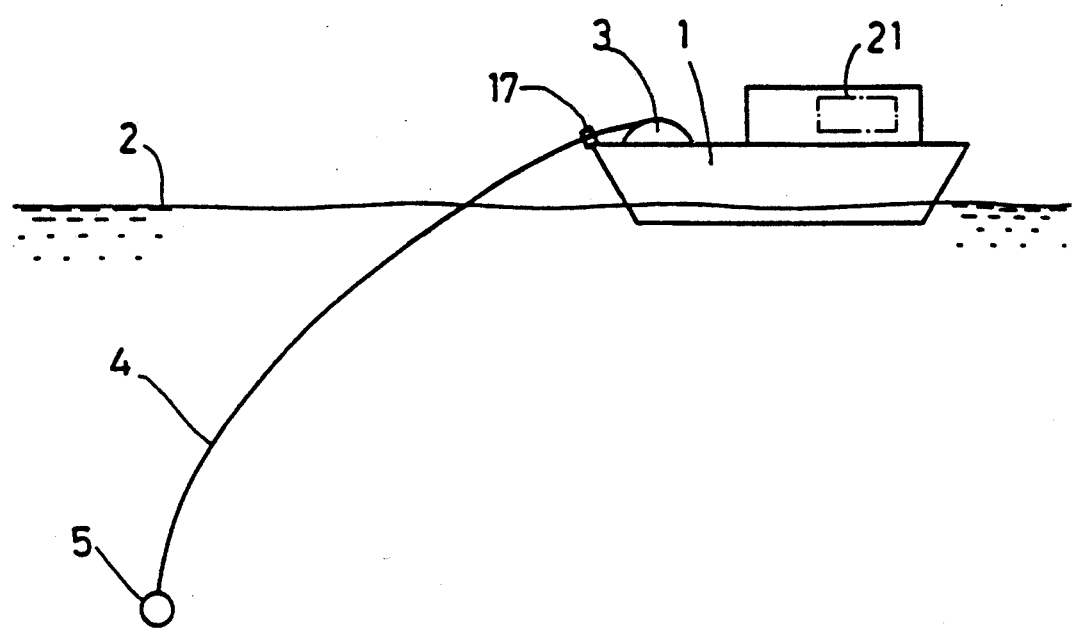
FIG. 2 is a schematic view of the entire system of the present invention.

FIG. 1 is a block diagram of an embodiment of this invention and FIG. 2 is a schematic view of the same. As shown, a ship body 1 is located on the water surface 2.

An optical fiber cable 4 is suspended from an on-board winch 3 into the water. A towed body 5 is attached to the end of the cable 4. The towed body 5 includes a pressure sensor 6, a current velocity sensor 7, a temperature sensor 8, a signal multiplexing unit 9 for multiplexing the electrical signals from these sensors, an eletro-optical converter (E/O) 10 for converting the multiplexed signals into optical signals, an isolator 11 which permits the passage of only the converted optical signals while blocking any signals in an opposite direction, and a battery 12 for supplying power to the devices in the towed body 5. The electro-optical converter 10 connected to the fiber cable 4 through the isolator 11.

A tension and cable length meter 17 is attached to the optical fiber cable 4 at its on-board portion.

An optical slip ring 18 is provided on the core of the winch 3. An optical fiber wiring 20 coupled to the optical fiber cable 4 is pulled out onto the deck of the ship by the optical slip ring 18. An on-board measuring device 21 includes a multiplexer/demultiplexer unit 22, a distribution temperature meter 23 for the optical fiber, a wavelength filter 24, an opto-electrical converter (O/E) 25, a signal separator 26 and a computer 27.

Figure 3:
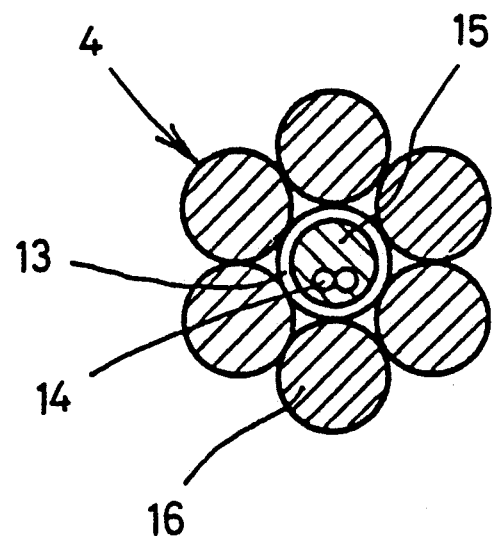
FIG. 3 is an enlarged sectional view of the optical fiber cable.

FIG. 3 shows a detailed structure of the optical fiber cable 4. The cable 4 includes a centrally located stainless steel pipe 13 in which one or two optical fibers 14 are sealed in a filler material (such as fluororesin) and steel wires 16 serving as tension members and twisted together around the pipe 13.

The temperature distribution meter 23 is a known meter. It serves to transmit optical pulses a for temperature measurement into the optical fiber cable 4 through the multiplexer/demultiplexer unit 22, optical fiber wiring 20 and optical slip ring 18 and to receive the backward scattered light b. For example, optical pulses a have a wavelength of 0.9 micron while the backward scattered light b (Raman light) has a wavelength of 0.9±0.04 micron.

Figure 4:
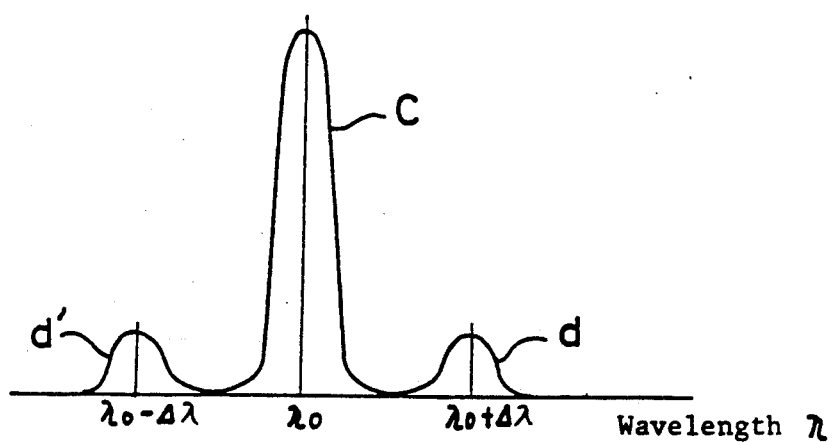
FIG. 4 is a graph showing the wavelength distribution of the scattered light.

In terms of the wavelength distribution, the backward scattered light b includes Rayleigh scattered light c (see FIG. 4) having the same wavelength ($\lambda_o$) as the incident light which is a and Raman scattered light deviated ±Δλ from the scattered light c. Their intensity is temperature dependent. The Ramen scattered light deviated +Δλ from $\lambda_o$ is referred to as Stokes' light d while the Ramen scattered light deviated −Δλ from $\lambda_o$ is referred to as anti-Stokes' light d'. Since the Raman scattered lights are extremely weak in intensity, the detection signals are added by repeating measurements to increase the S/N ratio.

Figure 5:
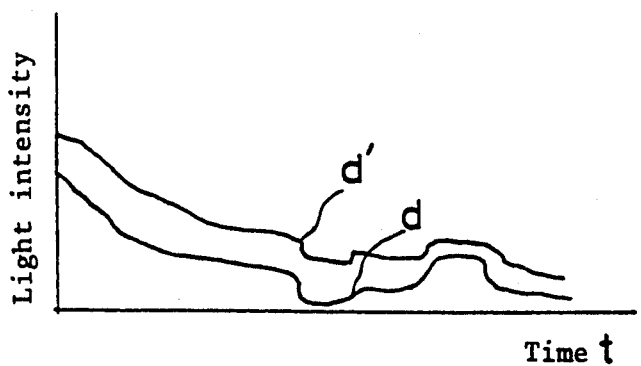
FIG. 5 is a graph showing the relation between light intensity and time.

From the signal thus obtained, as shown in FIG. 5, detection data are obtained which denote the relation between the time t elapsed from the incidence of the optical pulses and the intensity of the detected light. In FIG. 5 d represents the Stokes' light and d' the anti-Stokes' light. The data denoting the time detected light intensity are inputted in the computer 27 as distribution temperature data A (see FIG. 1).

Since the velocity of light in the optical fiber is known, the time t that elapsed from the incidence of the optical pulses to the detection of a signal represents the distance from the end of the optical fiber.

Figure 6:
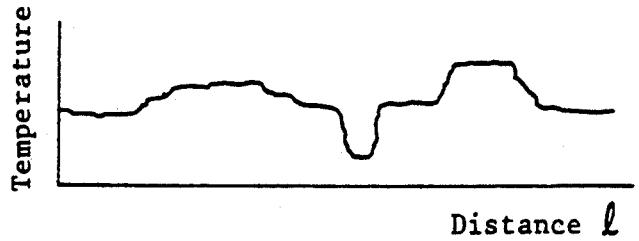
FIG. 6 is a graph showing the temperature distribution.

Since the intensity of the Raman scattered lights is temperature dependent, the temperature T can be determined from the intensity of the detected light. Thus, by processing in the computer 27 the relation between the distance l calculated from the time t and the temperature, the relation between the distance l and temperature, that is, a temperature distribution curve as shown in FIG. 6 is obtained.

On the other hand, the optical signals e (having a wavelength, of for example, 1.3 microns) incident into the optical fiber cable 4 through the isolator 11 in the towed body 5 are separated in the multiplexer/demultiplexer unit 22 in the measuring device 21 and only their wavelength components pass through the wavelength filter 24 (the multiplexer/demultiplexer unit 22 and the wavelength filter 24 may form a single unit). Then the signals are converted into electrical signals by the opto-electrical converter (O/E) 25. The electrical signals thus converted are separated by the signal separator 26 into pressure data B, current velocity data C and temperature data D, which are inputted in the computer 27.

Also, tension data E and cable length data F are inputted in the computer 27 from the tension/cable length meter 17. Data G denoting the ship speed are also inputted.

The optical fiber cable 4 curves in a catenary arch according to the ship speed and the current velocity.

Figure 7:
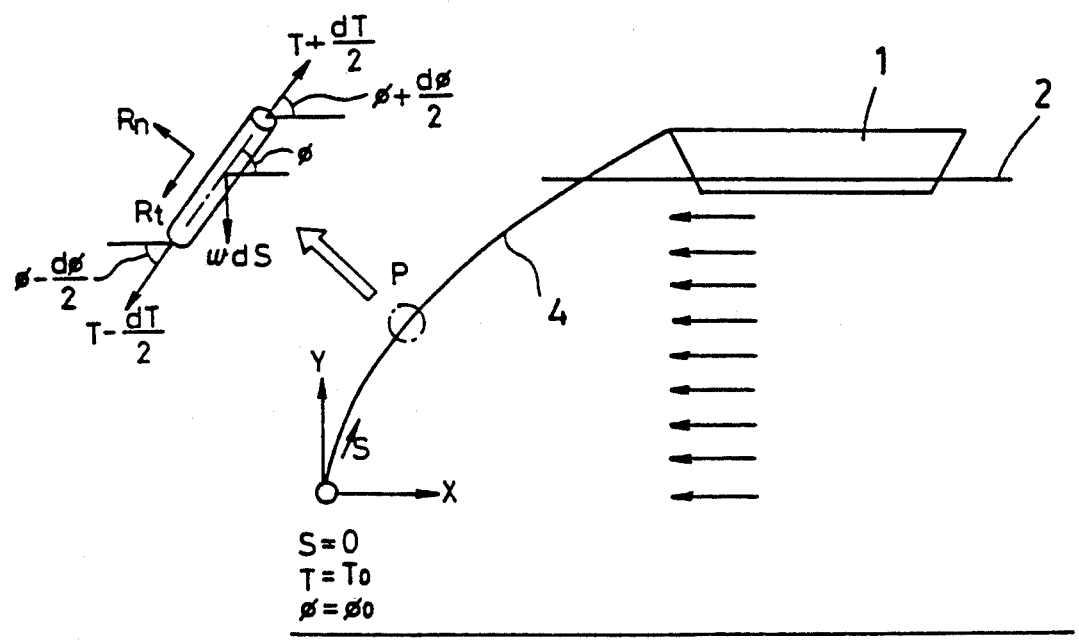
FIG. 7 is a model view for use in the description of theoretical formulas.

For example, the cable 4 will curve as shown in FIG. 7 if the cable is flexible and the current is uniform. The equilibrium of forces at a given portion P within a very short range is expressed by the following formula:

$$dT/dS = w \sin \phi + Rt \qquad (1)$$

$$T(d\phi/dS) = w \cos \phi - Rn \qquad (2)$$

$$dX/dS = \cos \phi \qquad (3)$$

$$dY/dS = \sin \phi \qquad (4)$$

wherein
 T is tensile force acting on the cable,
 $\phi$ is the angle between the cable and the current,
 S is the length along the cable,
 Rt is the hydrodynamic force in a tangential direction,
 Rn is the hydrodynamic force in a normal direction,
 X is the distance in a horizontal direction,
 Y is the distance in a vertical direction, and
 w is the underwater weight of the cable per unit length.

Using the Bode's model, the Rt and Rn values are given by the following formulas.

$$Rt = \frac{1}{2g} \tau d C_n V |V| f \qquad (5)$$

$$Rn = \frac{1}{2g} \tau d C_n V^2 \sin\phi |\sin\phi| \qquad (6)$$

wherein
 $\gamma$ is the specific weight of the fluid,
 V is the relative speed between the fluid and the cable,
 d is the outer diameter of the cable, f is Bode's constant,
Cn is the drag coefficient, and
g is the gravitational acceleration.

In FIG. 7, $T=T_0$ and $\phi=\phi_0$ respectively denote the tension and angle when $S=0$.

T (tensile force acting on the cable) can be calculated from the tension data E, S (length along the cable) from the cable length data F, and V (relative speed between the fluid and the cable) from the current velocity data C and the ship speed data G. w (underwater weight of the cable per unit length), $\gamma$(specific weight of the fluid), d(outer diameter of the cable), f(Bode's constant), Cn (drag coefficient) and g (gravitational acceleration) are known values.

Based on these data and the known values, the above formulas (1)–(4) are calculated in the computer 27 for the respective points on the cable at predetermined short intervals of dS, i.e. one point after another starting from the point where $S=O$ (starting point of calculation at the tip of the cable) toward the ship body 1. Thus, the X, Y and $\phi$ values are calculated for the respective points. By repeating these calculations, the X and Y values at the respective points, i.e. the water depth at the respective points taken along the catenary shape of the cable are obtained.

The above calculation method was shown as a mere example. Any other calculation method may be employed in determining the catenary shape of the cable.

The temperature distribution in the longitudinal direction of the optical fiber cable extending in a catenary arch is calculated making use of the fact that the intensity of the Raman light is temperature dependent.

On the other hand, since the water depth at the respective points in a catenary arch can be determined by the above calculation, the temperature distribution in the longitudinal direction can be corrected to the temperature distribution in the depth direction of the water (direction Y in FIG. 7) based on the results of the above calculation.

Pressure data B, temperature data D and the like are used for calibrating the measurement results.

What is claimed is:

1. A temperature distribution measurement system comprising:
   an optical fiber cable suspended from and towed by a ship and extending into a body of water, the length of said optical fiber cable forming an arch when towed by the ship;
   optical measuring means for inputting light energy into said optical fiber cable and for detecting with respect to time an intensity of return light energy from said optical fiber cable;
   a sensor housing, disposed in the water body and coupled to an end of said optical fiber cable, including at least one sensor which transmits sensor data;
   data processing means for determining a temperature along various points of said length of said optical fiber cable based on said intensity of said return light energy and for determining a depth within said water body of said various points of said length of said optical fiber cable based on said sensor data transmitted by said at least one sensor included in said sensor housing.

2. A temperature distribution measurement system as recited in claim 1, wherein said sensor housing includes means for optically transmitting the sensor data on said optical fiber cable.

3. A temperature distribution measurement system as recited in claim 2, further comprising means for separating said return light energy and said sensor data simultaneously received on said optical fiber cable.

4. A temperature distribution measurement system as recited in claim 1, wherein said at least one sensor includes a water current velocity sensor.

5. A temperature distribution measurement system as recited in claim 2, wherein said at least one sensor includes a water current velocity sensor.

6. A temperature distribution measurement system as recited in claim 3, wherein said at least one sensor includes a water current velocity sensor.

7. A temperature distribution measurement system as recited in claim 4, wherein said at least one sensor further includes a pressure sensor.

8. A temperature distribution measurement system as recited in claim 5, wherein said at least one sensor further includes a pressure sensor.

9. A temperature distribution measurement system as recited in claim 6, wherein said at least one sensor further includes a pressure sensor.

10. A temperature distribution measurement system as recited in claim 1, wherein said optical fiber cable comprises a metal pipe, optical fibers housed in said metal pipe together with a filler material, and tension members provided around said metal pipe, said metal pipe and said tension members being twisted together.

11. A temperature distribution measurement system as recited in claim 2, wherein said optical fiber cable comprises a metal pipe, optical fibers housed in said metal pipe together with a filler material, and tension members provided around said metal pipe, said metal pipe and said tension members being twisted together.

12. A temperature distribution measurement system as recited in claim 3, wherein said optical fiber cable comprises a metal pipe, optical fibers housed in said metal pipe together with a filler material, and tension members provided around said metal pipe, said metal pipe and said tension members being twisted together.

* * * * *